Dec. 25, 1951  G. L. WALBURN  2,579,988
TRACTOR MOUNTED PLANTER
Filed April 1, 1947  3 Sheets-Sheet 1

INVENTOR.
George L. Walburn
BY *Victor J. Evans & Co.*
ATTORNEYS

Dec. 25, 1951         G. L. WALBURN         2,579,988
TRACTOR MOUNTED PLANTER
Filed April 1, 1947         3 Sheets-Sheet 2
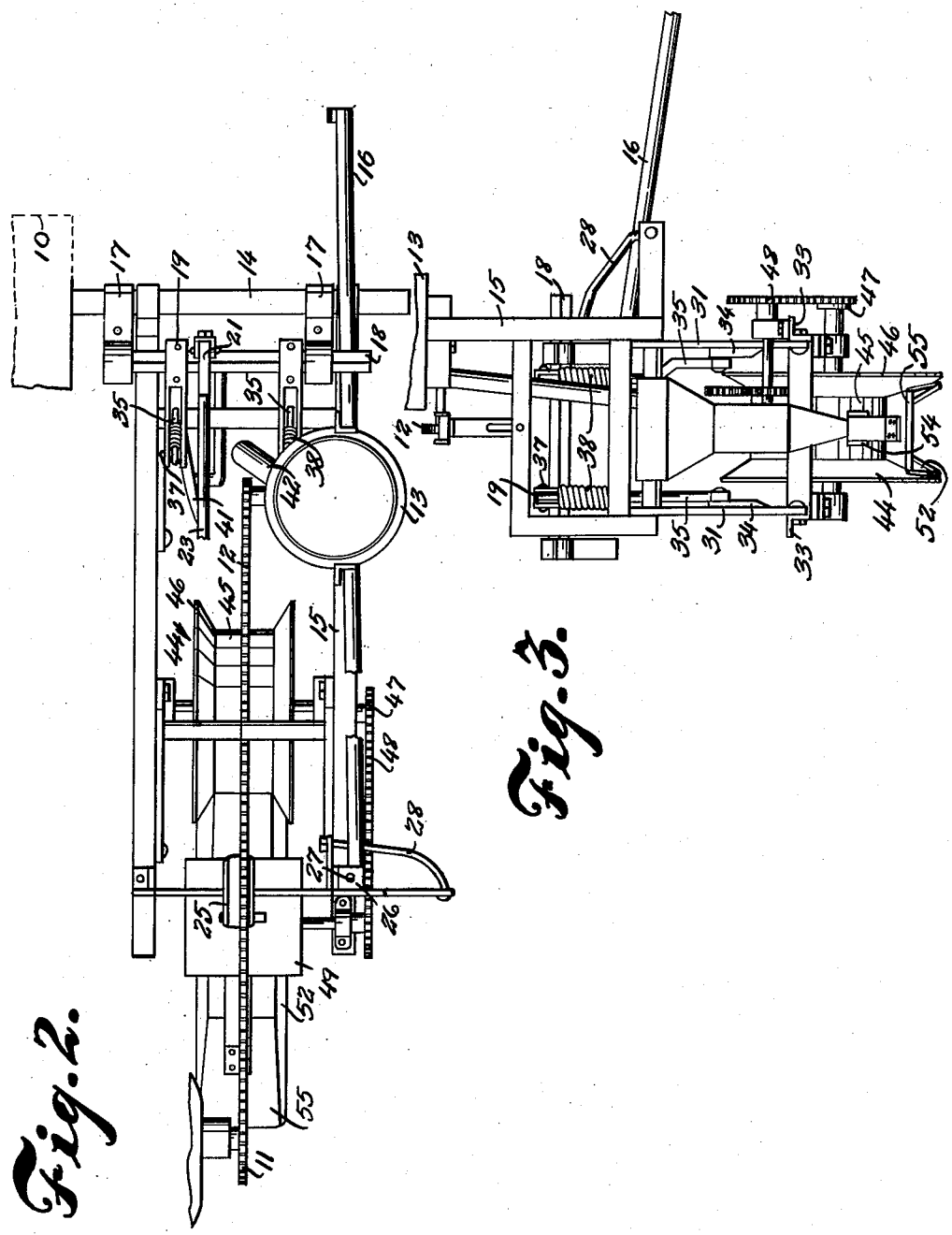
INVENTOR.
George L. Walburn
ATTORNEYS Dec. 25, 1951  G. L. WALBURN  2,579,988
TRACTOR MOUNTED PLANTER
Filed April 1, 1947  3 Sheets-Sheet 3
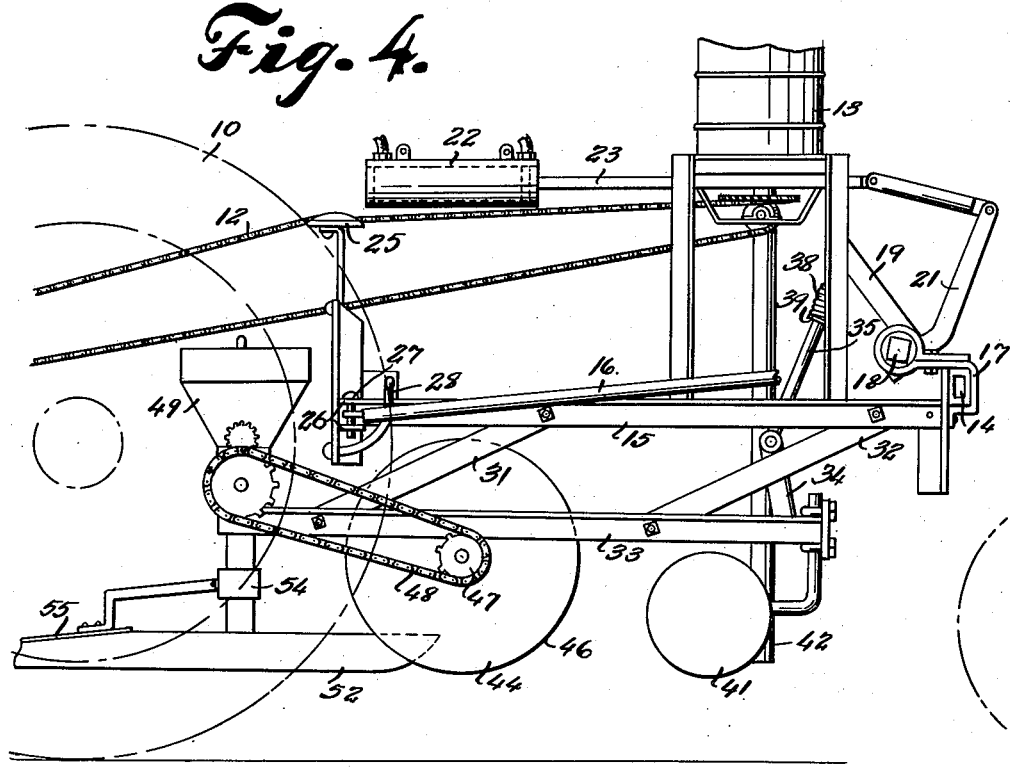
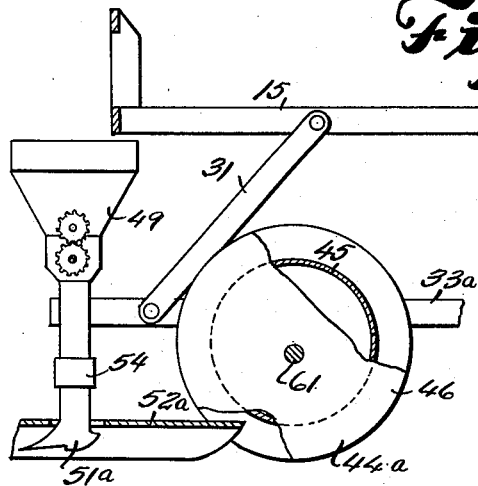
INVENTOR.
George L. Walburn
BY *Victor J. Evans & Co.*
ATTORNEYS Patented Dec. 25, 1951

2,579,988

UNITED STATES PATENT OFFICE 2,579,988

TRACTOR MOUNTED PLANTER

George L. Walburn, Auburn, Ind.

Application April 1, 1947, Serial No. 738,653

5 Claims. (Cl. 111—59)

This invention relates to tractor-mounted planters.

It is an object of the present invention to provide a tractor-mounted planter which will form a ridge of ground for the seeds so as to eliminate the possibility of hard crust forming over the seeds and to locate the seeds so that they will receive more heat from the sun and will germinate more quickly and whereby to provide a planter which is particularly adapted for the planting of early spring crops.

It is another object of the present invention to provide a planter in which ridges are formed to receive the seed and wherein the ridge as shaped by the packing wheel will be maintained throughout the planting operation upon this ridge and wherein scrapers will be located in rear of the packing wheel and at such a height thereon that the dirt leaves the packing wheel at the proper time so as to fall back in any holes which it may have caused on clinging to the packing wheel so that the ridge when presented to the seed shoe will not have holes in the same and will be smooth.

It is another object of the present invention to provide a planting arrangement wherein fertilizer is dropped on the ground before the ground has been disturbed and wherein the ridge will be spilt over the fertilizer and the seeds planted on the ridge and above the fertilizer.

Other objects of the present invention are to provide a ridge-type tractor planter which is of simple construction, easy to mount on the tractor, and which is efficient in operation.

For other objects and for a better understanding of the invention, reference may be had to the following detailed description taken in connection with the accompanying drawing, in which Fig. 1 is a side elevational view of a planter embodying the features of the present invention illustrated as mounted on a tractor with the tractor shown diagrammatically in dotted lines.

Fig. 2 is a top plan view of the planting unit.

Fig. 3 is a rear elevational view of the planting unit.

Fig. 4 is a side elevational view of the planting unit after it has been elevated to a position whereby the same may be transported.

Fig. 5 is a fragmentary and detail view of a planting arrangement wherein a packing wheel is eccentrically mounted and operates to raise and lower the seed boot to form a vertically wavy seed bed.

Figure 1:
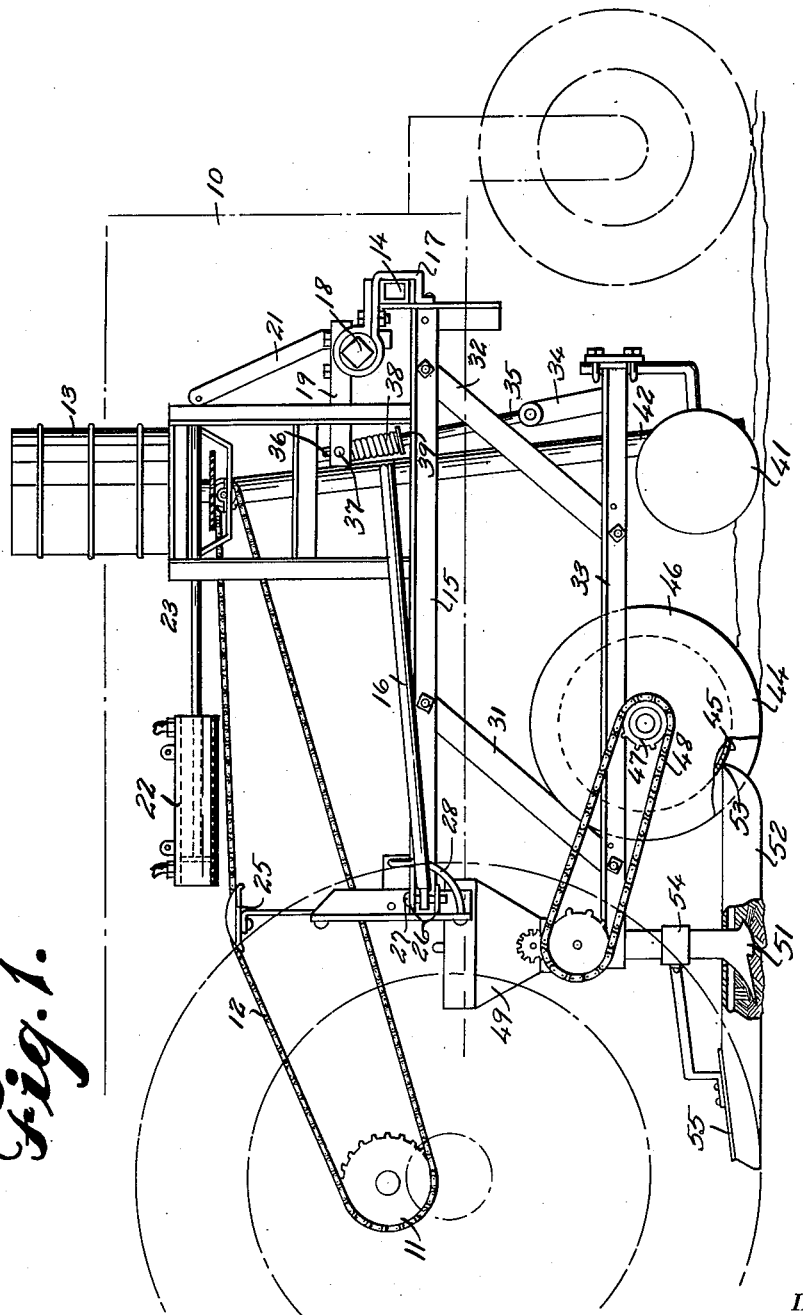

Referring now to the figures, 10 represents a tractor having a driving gear 11 for operating chain 12 connected to a fertilizer box 13. At the front of the tractor and extending from the side thereof is a cultivator tool bar 14 on which supporting frame 15 for the fertilizer device and for the marker bar 16 is connected.

The inner and outer sides of frame 15 have square opening formations 17 adapted to slide on the transversely extending bar 14. On this formation 17 there is pivoted a lifting bar 18 having lifting arms 19 and an operating arm 21 connected with a hydraulic power lift device 22 located at the side of the tractor and adapted to react thereagainst to extend its thrust rod 23 whereby to raise arms 19 upwardly.

At the rear of the frame 15, there is provided a support 25 over which the chain 12 is extended and vertically spaced projections 26 into which the rear end of the marker bar 16 is extended and secured for pivotal movement by a pin 27. Removed from the pivot pin 27 is a guide and support rod 28 which supports the marker bar 16 in its laterally extended position. The marker bar is retained on this supporting rod 28 in both its lowered and raised positions.

Extending downwardly from the frame 15 and longitudinally spaced from one another are parallel links 31 and 32 pivotally connected at their upper ends to the frame 15 and pivotally connected at their lower ends to longitudinally extending frame pieces 33 which provide a horizontally disposed lower frame. The forward ends of these frame pieces have an upstanding lug 34 to which lift rods 35 are connected. The lift rods 35 have a slot 36 in their upper ends through which a pin 37 which connects them with the lifting arms 19 extend. Below the lifting arms 19 and surrounding the rods 35 are pressure springs 38 which react between a flange 39 on the rods 35 and the lifting arms 19 to maintain the pieces 33 in their lowered position and the equipment thereon in tight engagement with the ground.

On the pieces 33 are dirt collecting tools or discs 41 which collect the dirt into a rough ridge. Before so collecting the dirt fertilizer is distributed on the undisturbed ground by a fertilizer delivery tube 42 extending from the fertilizer 13.

In rear of the dirt collecting tools 41 is a ridge forming or packing wheel 44 which forms the collected dirt into a well formed ridge on which the planting is to be effected. This packing wheel has a central portion 45 and side portions 46. As the wheel 44 is rotated, it drives a gear 47 thereon which is connected by a chain 48 with a seed dispenser 49 which delivers seed through its shoe 51 which enters the top of the ridge to deposit the seed therewithin.

Mounted over the seed boot 51 is a combined packing wheel scraper and ridge holding plate 52 of channel section having a top and sides depending from the top. The forward edge enters the packing wheel 44 and engages with the central portion 45 thereof as indicated at 53 in Fig. 1. Any dirt which may be lifted from the ridge by the packing wheel is immediately returned to the ridge and deposited on the ridge from which it was removed whereby a smooth and compact ridge is maintained. The ridge will therefore be smooth as the seed boot 51 passes through it. On the seed device 49 is a bracket 54 which supports a seed covering plate 55 upon the side flanges of the plate 52, which is also supported by the bracket, and the covering plate finally forms and packs the ridge. Even while the covering plate 55 is acting on the top of the ridge the sides of the ridge will be retained by the combined ridge holding and scraper device.

It should be understood that there are two of the fertilizing and seed planting arrangements just described, one arrangement on each side of the tractor whereby two rows are planted at a time. When it is desired to transport the planters, the power lift devices 22 are operated and parts are raised as illustrated in Fig. 4.

Referring now to Fig. 5, there is shown a modified form of the invention. The packing wheel 44a is connected to the pieces 33a through an axle 61 offset from its center whereby as the wheel moves along the boot 51a will form a wavy seed bed with portions raised and other portions lowered. The axle 61 extends through the wheel 44 as shown and this and also the seed dispenser 49 and covering plate 55 are carried by the frame 33a. Seed is accordingly planted at varying depth so that some of the seed will at all times meet with the changing conditions of heat and moisture and germinate under all conditions. Later on after the seed has sprouted and it is necessary to eliminate the weeds which have grown faster than the seedlings, the faster growing weeds can be more readily detected inasmuch as the seedlings will be on a ridge and raised above the weeds.

With the ridge well packed to maintain its form, it will not melt down or wash flat from heavy rain. Water will drain from the ridge and will not lie over the seeds to form a crust thereover.

It should thus now be apparent that according to the planting arrangement of the present invention there is provided a well packed ridge, a well drained non-crusting seed bed, a warmer location for the seeds, and a well defined row with undisturbed fertilizer.

Having now described my invention, I claim:

1. A tractor-mounted seed planter arrangement comprising a main supporting frame adapted to be attached to the side of a tractor, planter supporting pieces connected to the main frame for vertical adjustment, lifting means connected between the planting device pieces and operable upon the main frame to adjust the planting device pieces between raised and lowered positions, soil collecting tools on the planting device pieces, a packing wheel adapted to form a ridge from the soil which has been collected by the soil collecting tools, a seed planting device mounted on the planting device pieces in rear of the packing wheel and connected to the packing wheel to be driven by the same, said seed planting device having a shoe adapted to enter the center of the ridge formed by the packing wheel, and a combined ridge holding and scraper device supported on and over the planting device shoe and adapted to enter the packing wheel to remove dirt thereon so as to return the dirt to the ridge from which it has been removed whereby to maintain a smooth top on the ridge for the seed planting device shoe to enter, and a seed covering plate connected to the seed planting device and positioned in the ridge holding and scraper device to cover the seed deposited by the seed shoe.

2. In a planter attachment for a tractor, the combination which comprises a main supporting frame having tractor attaching means thereon, a horizontally disposed lower frame below and spaced from the said main frame, sloping links pivotally connecting the lower frame to the upper frame, means adjusting the elevation of the said lower frame in relation to the main frame, spaced soil collecting discs journaled on and suspended from the said lower frame and positioned to gather soil toward the longitudinal center of the attachment, a ridge forming packing wheel journaled on the lower frame aligned with and positioned to follow the said soil collecting discs, a seed planter carried by the lower frame aligned with the packing wheel and collecting discs and positioned to follow the said packing wheel, means driving the said planter from the packing wheel, said seed planter having a depending boot positioned to enter the center of the ridge formed by the wheel, a combined ridge holder and scraper carried by the boot of the planter covering the lower end of the boot and positioned with the forward end thereof extended into the packing wheel for removing soil therefrom whereby the soil is returned to the ridge, and a seed covering plate also carried by the boot of the planter and positioned on the scraper for covering seed deposited by the planter boot.

3. In a planter attachment for a tractor, the combination which comprises a main supporting frame having tractor attaching means thereon, a horizontally disposed lower frame below and spaced from the said main frame, sloping links pivotally connecting the lower frame to the upper frame, means adjusting the elevation of the said lower frame in relation to the main frame, spaced soil collecting discs journaled on and suspended from the said lower frame and positioned to gather soil toward the longitudinal center of the attachment, a ridge forming packing wheel journaled on the lower frame, eccentrically mounted thereon and aligned with and positioned to follow the said soil collecting discs, a seed planter carried by the lower frame aligned with the packing wheel and collecting discs and positioned to follow the said packing wheel, means driving the said planter from the packing wheel, said seed planter having a depending boot positioned to enter the center of the ridge formed by the wheel, a combined ridge holder and scraper carried by the boot of the planter covering the lower end of the boot and positioned with the forward end thereof extended into the packing wheel for removing soil therefrom whereby the soil is returned to the ridge, and a seed covering plate also carried by the boot of the planter and positioned on the scraper for covering seed deposited by the planter boot.

4. In a planter attachment, the combination which comprises a mounting frame having means for attaching the frame to a tractor, soil gathering means carried by the frame, a flanged ridge forming wheel journaled in the frame and positioned to follow the said soil gathering means, a planter having a boot depending therefrom carried by the frame, a ridge holder and scraper channel shape in cross section carried by the boot of the planter and covering the lower end of the boot, the forward end of said ridge holder and scraper extended into the said flanged wheel for scraping soil from the surface of the wheel, and a seed covering plate carried by the boot and positioned on the trailing end of the said holder and scraper.

5. In a planter attachment, the combination which comprises a mounting frame having means for attaching the frame to the tractor, soil gathering means carried by the frame, a flanged ridge forming wheel journaled in the frame and positioned to follow the said soil gathering means, a planter having a boot depending therefrom carried by the frame, a ridge holder and scraper channel shape in cross section carried by the boot of the planter and covering the lower end of the boot, the forward end of said ridge holder and scraper extended into the said flanged wheel for scraping soil from the surface of the wheel, a seed covering plate carried by the boot and positioned on the trailing end of the said holder and scraper, means actuating the planter by the flanged ridge forming wheel, and means adjusting the elevation of the elements in the frame.

GEORGE L. WALBURN.

REFERENCES CITED

The following references are of record in the file of this patent:

UNITED STATES PATENTS

| Number | Name | Date |
|---|---|---|
| 225,804 | Dart | Mar. 23, 1880 |
| 357,470 | Davis | Feb. 8, 1887 |
| 471,863 | Horne et al. | Mar. 29, 1892 |
| 1,030,759 | Allen | June 25, 1912 |
| 1,329,375 | Collins | Feb. 3, 1920 |
| 1,864,122 | Cole | June 21, 1932 |
| 1,940,992 | Beall | Dec. 26, 1933 |
| 2,015,584 | Benjamin | Sept. 24, 1935 |
| 2,337,749 | Hand | Dec. 28, 1943 |
| 2,365,201 | McKahin | Dec. 19, 1944 |

FOREIGN PATENTS

| Number | Country | Date |
|---|---|---|
| 2,869 | Great Britain | 1879 |
| 9,247 | Great Britain | 1897 |
| 25,751 | Germany | Feb. 26, 1884 |